United States Patent
Yeou et al.

(10) Patent No.: US 9,083,035 B2
(45) Date of Patent: Jul. 14, 2015

(54) SEPARATOR AND RECHARGEABLE LITHIUM BATTERY

(75) Inventors: Jung-Ock Yeou, Yongin-si (KR); Ihn Kim, Yongin-si (KR); Sam-Jin Park, Yongin-si (KR); Kwi-Seok Choi, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 134 days.

(21) Appl. No.: 13/601,846

(22) Filed: Aug. 31, 2012

(65) Prior Publication Data

US 2013/0252066 A1     Sep. 26, 2013

(30) Foreign Application Priority Data

Mar. 22, 2012  (KR) ......................... 10-2012-0029427

(51) Int. Cl.
- *H01M 2/16* (2006.01)
- *H01M 2/14* (2006.01)
- *H01M 10/0525* (2010.01)

(52) U.S. Cl.
CPC ............ *H01M 2/166* (2013.01); *H01M 2/1666* (2013.01); *H01M 2/1686* (2013.01); *H01M 2/145* (2013.01); *H01M 10/0525* (2013.01); *Y02E 60/122* (2013.01)

(58) Field of Classification Search
None
See application file for complete search history.

(56) References Cited

U.S. PATENT DOCUMENTS

| | | | |
|---|---|---|---|
| 6,077,640 A * | 6/2000 | Komai et al. | 430/108.3 |
| 6,322,923 B1 | 11/2001 | Spotnitz et al. | |
| 6,632,561 B1 | 10/2003 | Bauer et al. | |
| 7,655,360 B2 | 2/2010 | Hennige et al. | |
| 7,691,528 B2 | 4/2010 | Hennige et al. | |
| 8,053,102 B2 | 11/2011 | Hennige et al. | |
| 8,277,981 B2 | 10/2012 | Kim et al. | |
| 2005/0087491 A1 | 4/2005 | Hennige et al. | |
| 2006/0073345 A1 | 4/2006 | Naruse | |
| 2008/0248381 A1 | 10/2008 | Hennige et al. | |
| 2010/0279173 A1 | 11/2010 | Hying et al. | |
| 2013/0244080 A1 * | 9/2013 | Song et al. | 429/144 |

FOREIGN PATENT DOCUMENTS

| | | |
|---|---|---|
| JP | 10-287764 A | 10/1998 |
| JP | 2009-87948 A | 4/2009 |
| JP | 2011-134584 A | 7/2011 |
| KR | 10-1999-0066849 A | 8/1999 |
| KR | 10-2008-0017114 A | 2/2008 |
| WO | WO 00/26977 A1 | 5/2000 |
| WO | WO 03/072232 A1 | 9/2003 |
| WO | WO 03/073534 A2 | 9/2003 |
| WO | WO 2004/021469 A2 | 3/2004 |

(Continued)

OTHER PUBLICATIONS

Quarzwerke Product Data Sheet for Tremin 283 Wollastonite.*

(Continued)

*Primary Examiner* — Patrick Ryan
*Assistant Examiner* — Wyatt McConnell
(74) *Attorney, Agent, or Firm* — Knobbe Martens Olson & Bear LLP

(57) ABSTRACT

In one aspect, a separator that includes a porous substrate; and a coating layer including an inorganic compound-organic/inorganic binder, and a binder polymer, and a rechargeable lithium battery including the separator is provided.

13 Claims, 1 Drawing Sheet

(56) References Cited

FOREIGN PATENT DOCUMENTS

| WO | WO 2005/038946 A2 | 4/2005 |
|---|---|---|
| WO | WO 2005/038960 A1 | 4/2005 |
| WO | WO 2007/028662 A1 | 3/2007 |
| WO | WO 2009/066946 A2 | 5/2009 |

OTHER PUBLICATIONS

European Extended Search Report dated Mar. 13, 2006 for European Patent Application No. 12 199 209.3 which shares priority of Korean Patent Application No. KR 10-2012-0229427 with captioned U.S. Appl. No. 13/601,846.

* cited by examiner

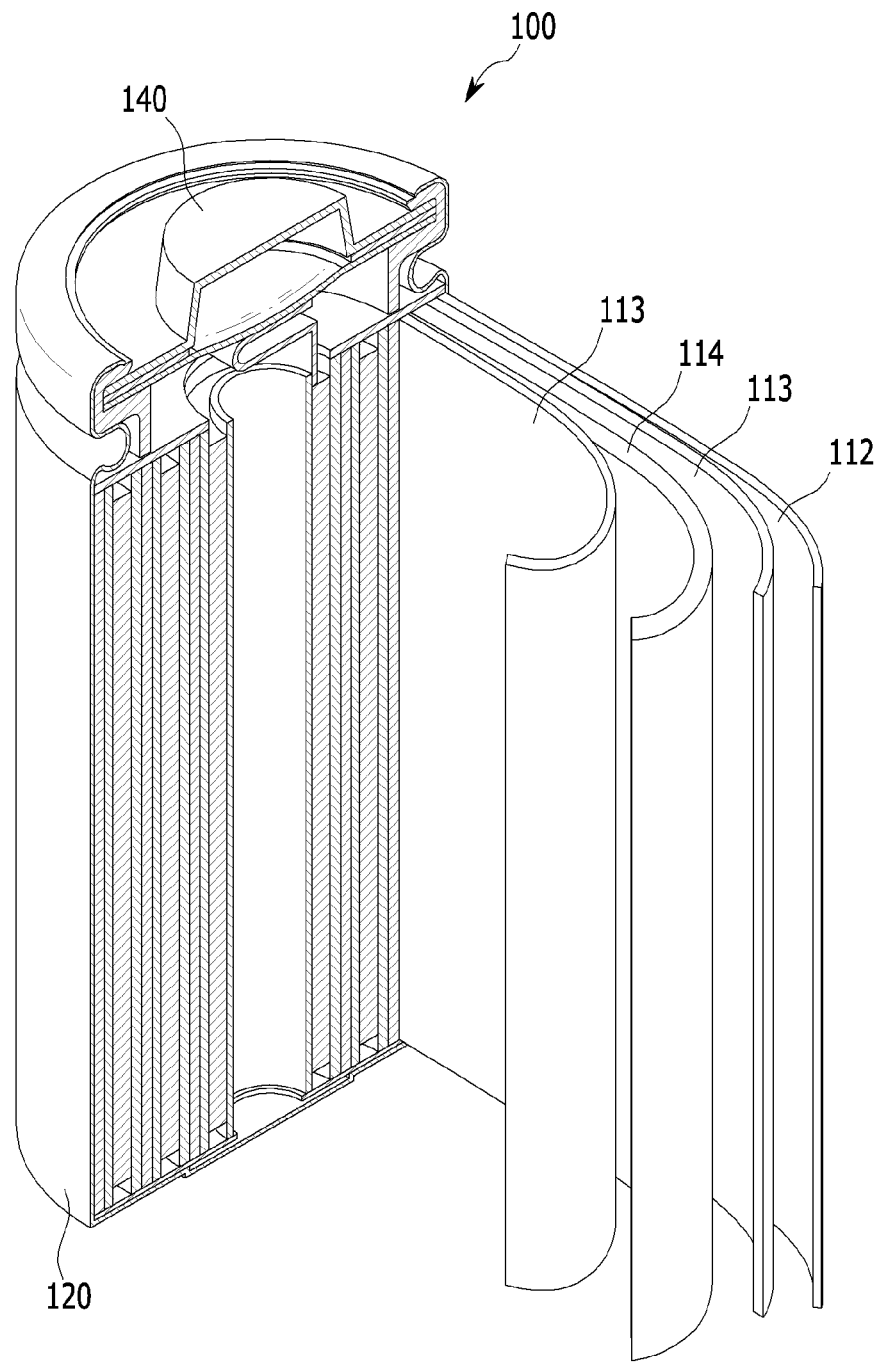

SEPARATOR AND RECHARGEABLE LITHIUM BATTERY

CROSS-REFERENCE TO RELATED APPLICATION

This application claims priority to and the benefit of Korean Patent Application No. 10-2012-0029427 filed on Mar. 22, 2012 in the Korean Intellectual Property Office, the disclosure of which is incorporated herein by reference.

BACKGROUND

1. Field

A separator and a rechargeable lithium battery is disclosed.

2. Description of the Related Technology

A conventional non-aqueous rechargeable lithium battery typically includes a separator made of a porous insulating film and interposed between positive and negative electrodes, and the pores of the film typically are impregnated by an electrolyte solution including a lithium salt dissolved therein.

The non-aqueous rechargeable lithium battery has excellent high-capacity and high energy density characteristics. However, when the positive and negative electrodes of the non-aqueous rechargeable lithium battery are repetitively contracted and expanded during the repeated charge and discharge cycles they may react with a separator or an electrolyte, and thus, the non-aqueous rechargeable lithium battery may be easily deteriorated, have internal and external short circuits, and rapidly become hot.

The separator may be fused and rapidly contracted or destroyed and thus, short-circuited when the temperature of the battery rapidly increases. In order to prevent this problem, a conventional separator is typically formed of a porous polyethylene film to prevent shutdown. The shutdown typically indicates that a separator is partly fused and thus, closes pores and cuts off a current, when a battery is heated up due to overcharge, external or internal short circuit. In addition, an attempt has been made to improve safety of the non-aqueous rechargeable lithium battery by improving heat resistance of a separator and in particular, to secure safety even when a separator therein is sharply contracted or destroyed.

SUMMARY

One embodiment of this disclosure provides a method of improving heat resistance of a separator. In certain embodiments, having improved heat resistance may improve safety of a rechargeable lithium battery and reduce the cost of a rechargeable lithium battery by reducing the manufacture cost of a separator.

According to one embodiment this disclosure, a separator that includes a porous substrate; and a coating layer including an inorganic compound-organic/inorganic binder, and a binder polymer is provided, wherein the inorganic compound-organic/inorganic binder is made by reacting an inorganic compound and an organic/inorganic binder.

In certain embodiments, the coating layer may include less than or equal to about 70 parts by weight of the inorganic compound-organic/inorganic binder based on 100 parts by weight of the binder polymer. In certain embodiments, the coating layer may include from about 1 part by weight to about 70 parts by weight of the inorganic compound-organic/inorganic binder based on 100 parts by weight of the binder polymer.

In certain embodiments, the inorganic compound-organic/inorganic binder may be particles with an average a particle diameter of about 1 nm to about 1000 nm.

In certain embodiments, the inorganic compound-organic/inorganic binder particles may be coated continuously or discontinuously on the surface of the binder polymer. In certain embodiments, the inorganic compound-organic/inorganic binder particles may be coated continuously on the surface of the binder polymer. In certain embodiments, the inorganic compound-organic/inorganic binder particles may be coated discontinuously on the surface of the binder polymer.

In certain embodiments, the inorganic compound may include at least one component selected from the group consisting of metal oxide, semi-metal oxide, and metal fluoride. In certain embodiments, the inorganic compound may be selected from the group consisting of a metal oxide, a semi-metal oxide, and metal fluoride. In certain embodiments, the inorganic compound may be a metal oxide. In certain embodiments, the inorganic compound may be a semi-metal oxide. In certain embodiments, the inorganic compound may be a metal fluoride.

In certain embodiments, the organic/inorganic binder may be a silane-based compound.

In certain embodiments, the organic/inorganic binder may be the hydrolyzed product of a silane coupling agent.

The silane coupling agent may include one component selected from the group consisting of an alkoxy group, a halogen, an amino group, a vinyl group, a glycidoxy group, and a hydroxyl group. In certain embodiments, the silane coupling agent may include an alkoxy group. In certain embodiments, the silane coupling agent may include a halogen. In certain embodiments, the silane coupling agent may include an amino group. In certain embodiments, the silane coupling agent may include one component selected from the group consisting of a vinyl group. In certain embodiments, the silane coupling agent may include a glycidoxy group. The silane coupling agent may include a hydroxyl group.

In certain embodiments, the silane coupling agent may include at least one component selected from the group consisting of vinylalkylalkoxysilane, epoxyalkylalkoxysilane, aminoalkylalkoxysilane, mercaptoalkylalkoxysilane, halogenated alkylalkoxysilane, vinylhalosilane, and alkylacyloxysilane.

In certain embodiments, the coating layer may include the organic/inorganic binder in an amount of about 0.05 to about 5 parts by weight based on 100 parts by weight of the binder polymer.

In certain embodiments, the binder polymer may include a cross-linking functional group.

In certain embodiments, the cross-linking functional group may include one or more components selected from the group consisting of a hydroxyl group, a glycidyl group, an amino group, an N-methylol group, and a vinyl group.

In certain embodiments, the binder polymer may include one or more components selected from the group consisting of a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, an ethylene propylene copolymer, polyethylene oxide, polyvinylpyrrolidone, polyepichlorohydrine, polyphosphazene, polyacrylate, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol, carboxylmethyl cellulose, hydroxypropylmethyl cellulose, hydroxypropyl cellulose, and diacetyl cellulose.

In certain embodiments, the binder polymer may be a particle having a diameter of about 0.01 μm to about 0.5 μm. In certain embodiments, the binder polymer may be a particle having a diameter of about 0.03 μm to about 0.4 μm. In certain embodiments, the binder polymer may be a particle having a diameter of about 0.07 μm to about 0.3 μm. In certain embodiments, the binder polymer may be a particle having a diameter of about 0.1 μm to about 0.2 μm.

In certain embodiments, the coating layer may be formed by mixing the inorganic compound particles and the organic/inorganic binder with an emulsion solution of the binder polymer to prepare a composition and coating the composition.

In certain embodiments, the porous substrate may include one or more components selected from the group consisting of a glass fiber, polyester, polyolefin, polytetrafluoroethylene (PTFE), and polyacrylonitrile.

In certain embodiments, the coating layer of the separator may be formed on one side or both sides of the porous substrate.

Some embodiments provide a rechargeable lithium battery that includes a positive electrode including a positive active material; a negative electrode including a negative active material; a non-aqueous electrolyte; and the separator.

In certain embodiments, the rechargeable lithium battery may have excellent safety properties and be manufactured with a lower cost.

Some embodiments provide a separator comprising: a porous substrate; and a coating layer including an (inorganic compound)-(organic/inorganic binder)-(binder polymer), where the (inorganic compound)-(organic/inorganic binder)-(binder polymer) is formed by reacting an inorganic compound, an organic/inorganic binder, and an binder polymer. In certain embodiments, the porous substrate comprises at least one component selected from the group consisting of a glass fiber, polyester, polyolefin, polytetrafluoroethylene (PTFE), and polyacrylonitrile.

BRIEF DESCRIPTION OF THE DRAWING

FIG. 1 is a schematic view showing the structure of a rechargeable lithium battery according to aspect of the present embodiments.

DETAILED DESCRIPTION

Exemplary embodiments will hereinafter be described in detail. However, these embodiments are exemplary, and this disclosure is not limited thereto.

Some embodiments provide a separator including a porous substrate; and a coating layer including an inorganic compound, a binder polymer, and an organic/inorganic binder.

In certain embodiments, the organic/inorganic binder may be chemically bound to the inorganic compound and the binder polymer and thus, form (inorganic/organic)-(organic/inorganic binder)-(binder polymer) composite in a form of a particle. When the composite of the inorganic compound and the bonder polymer is formed using the organic/inorganic binder, the inorganic compound may form a coating layer on the surface of the binder polymer. In certain embodiments, the coating layer of the inorganic compound may be present continuously or discontinuously.

In certain embodiments, the inorganic compound may have hydrophilic particles having a hydroxyl group on the surface. In certain embodiments, the inorganic compound as hydrophilic particles may have high reactivity for the binder polymer or the organic/inorganic binder. In addition, the inorganic compound may have an amorphous phase.

In certain embodiments, the inorganic compound may be at least one component selected from the group consisting of metal oxide and semi-metal oxide. For example, the inorganic compound may be at least one component selected from the group consisting of silica, alumina, titanium dioxide, zirconium dioxide, and magnesium fluoride. In addition, the inorganic compound may include additional components that are electrochemically-stable in a rechargeable lithium battery.

In certain embodiments, the inorganic compound may have, for example, an average particle diameter ranging from about 1 nm to about 1000 nm. When the inorganic compound is in a form of a particle it may be mixed with the binder polymer. In another embodiment, the inorganic compound may have an average particle diameter ranging from about 1 nm to about 100 nm. In yet another embodiment, the inorganic particle may have an average diameter ranging from about 10 nm to about 100 nm. The inorganic compound having a particle size within the range may apply appropriate strength to the coating layer of a separator.

In certain embodiments, the inorganic compound may be in a colloid state. In certain embodiments, the inorganic compound in a colloid state may be acidic, neutral, or alkali, for example, have pH ranging from about 8.5 to about 10.5. In certain embodiments, the inorganic compound particles included in a colloid solution within the pH range may be prevented from agglomeration and gelation among the particles and maintain storage stability well.

In certain embodiments, the coating layer may include less than or equal to about 70 parts by weight of the inorganic compound-organic/inorganic binder based on 100 parts by weight of the binder polymer. In certain embodiments, the coating layer may include about 0.2 parts to about 50 parts by weight of the inorganic compound-organic/inorganic binder based on 100 parts by weight of the binder polymer. In certain embodiments, the coating layer may include about 0.6 parts to about 30 parts by weight of the inorganic compound based on 100 parts by weight of the binder polymer. In certain embodiments, the coating layer includes an inorganic compound and thus, may provide to the separator having the coating layer with appropriate strength and heat resistance. Accordingly, the separator may improve safety of a rechargeable lithium battery. In addition, the inorganic compound may be connected on the surface of the binder polymer through an organic/inorganic binder linker and uniformly exists thereon and is stably dispersed in a coating layer and thus may be used in a small amount.

In certain embodiments, the organic/inorganic binder may be a silane-based compound. In certain embodiments, the organic/inorganic binder may be the hydrolyzed product of a silane coupling agent. In certain embodiments, the silane coupling agent may be an organosilicon compound having a hydrolysable functional group. The organocsilicon compound further may have organic bindable function group. In certain embodiment, the hydrolysable functional group is a functional group capable of bonding inorganic particles such as silica and the like after the hydrolysis. For example, the silane coupling agent may include at least one hydrolysable functional group selected from the group consisting of an alkoxy group, a halogen, an amino group, a vinyl group, a glycidoxy group, and a hydroxyl group, and the organic bindable functional group selected from the group consisting of imidazole group, amine group, epoxy group, meta-cresol group Specific examples of the organic/inorganic binder may include, for example, vinylalkylalkoxysilane such as vinyltris (β-methoxyethoxy)silane, γ-methacryloxypropyltrimethoxysilane, and the like; epoxyalkylalkoxysilane such as γ-glycidoxypropyltrimethoxysilane, β-(3,4-epoxycyclohexyl)ethyltrimethoxysilane, γ-glycidoxypropylmethyldiethoxysilane, and the like; aminoalkylalkoxysilane such as γ-aminopropyltriethoxysilane, and the like; mercaptoalkylalkoxysilane such as γ-mercaptopropyltrimethoxysilane, and the like; halogenated alkylalkoxysilane such as γ-chloropropyltrimethoxysilane, and the like; vinylhalosilane such as vinyltrichlorosilane, and the like; an alkylacyloxysilane such as methyltriacetoxysilane, and the like; and the like but are not limited thereto. Any silane coupling agent that has been used in this art may be used as the organic/inorganic binder.

In certain embodiments, the organic/inorganic binder may include an organic bindable functional group. In certain embodiments, the organic bindable functional group of the organic/inorganic binder may have reactivity with a cross-linking functional group included in a binder polymer described hereinafter.

In certain embodiments, the organic/inorganic binder may be combined with the binder polymer through the organic bindable functional group. As described above, the inorganic compound may be linked to the binder polymer through the organic/inorganic binder, forming the coating layer. As a result, the coating layer may have excellent heat resistance, even though the small amount of an inorganic compound is included therein. In addition, a binder polymer exposed on the surface of the coating layer has more surface area, improving adherence of the coating layer to an electrode. In certain embodiments, the organic/inorganic binder may be included in an amount of about 0.05 parts to about 5 parts by weight and specifically, about 0.3 parts to about 2 parts by weight based on 100 parts by weight of the binder polymer. When the organic/inorganic binder is included in an amount of less than about 0.05 parts by weight, the binder polymer may be insufficiently combined with the inorganic compound, and thus provide insufficient heat resistance. In addition, when the organic/inorganic binder is included in an amount of greater than about 5 parts by weight, a large amount of a non-reacted organic/inorganic binder may remain and deteriorate characteristics of a rechargeable lithium battery. In certain embodiments, the coating layer includes an organic/inorganic binder within the concentration range and accomplishes an advantage of appropriately bonding an inorganic compound and a binder polymer as aforementioned and in addition improves heat resistance of a separator having the coating layer, resulting in improvement of safety of a rechargeable lithium battery including the separator.

In certain embodiments, the binder polymer may be an acryl-based polymer, a diene-based polymer, a styrene-based polymer, and the like.

Polymerizable monomers for obtaining the binder polymer may be a polymerizable monomer having a cross-linking functional group and the polymerizable monomer may include, for example, an ethylenic unsaturated carbonic acid alkyl ester such as methyl(meth)acrylate, butyl(meth)acrylate, ethyl(meth)acrylate, 2-ethylhexyl(meth)acrylate, hydroxyethylacrylate, and the like; an ethylenic unsaturated monomer having a cyano group such as acrylonitrile, methacrylonitrile, fumaronitrile, α-chloro acrylonitrile, α-cyanoethylacrylonitrile, and the like; a conjugated diene monomer such as 1,3-butadiene, isoprene, 2,3-dimethyl-1,3-butadiene, 2-ethyl-1,3-butadiene, 1,3-pentadiene, chloroprene, and the like; ethylenic unsaturated carboxylic acid and a salt thereof such as acrylic acid, methacrylic acid, maleic acid, fumaric acid, citraconic acid, itaconic acid, and the like; an aromatic vinyl monomer such as styrene, alkyl styrene, vinyl naphthalene, and the like; a fluorine alkyl vinyl ether such as fluorine ethyl vinyl ether, and the like; a non-conjugated diene monomer such as vinyl pyridine; vinylnorbornene, dicyclopentadiene, 1,4-hexadiene, and the like; α-olefin such as ethylene, propylene, and the like; an ethylenic unsaturated amide monomer such as (meth)acryl amide; a sulfonic acid-based unsaturated monomer such as acryl amide methyl propane sulfonic acid, styrene sulfonic acid, and the like.

In addition, the polymerizable monomer having a cross-linking functional group may be used in an amount of less than or equal to about 5 wt %, in particular, about 2 wt % based on the entire weight of the polymerizable monomers used to prepare the binder polymer. In certain embodiments, the polymerizable monomer having a cross-linking functional group may be used in an amount ranging from about 0.5 wt % to about 5 wt % based on the entire weight of the polymerizable monomers used to prepare the binder polymer. In certain embodiments, the cross-linking functional group may form a cross-linking point during cross-linking of the binder polymer and for example, include a hydroxyl group, a glycidyl group, an amino group, an N-methylol group, a vinyl group, and the like. Examples of the polymerizable monomer having a cross-linking functional group may include hydroxy ester of ethylenic unsaturated carboxylic acid such as hydroxypropyl(meth)acrylate, hydroxyethyl(meth)acrylate, and the like; glycidyl ester of ethylenic unsaturated carboxylic acid such as glycidyl(meth)acrylate, and the like; amino ester of ethylenic unsaturated carboxylic acid such as dimethylaminoethyl(meth)acrylate; methylol group-containing ethylenic unsaturated amide such as N-methylol(meth)acryl amide, N,N-dimethylol(meth)acryl amide, and the like; a monomer having two or more vinyl groups such as ethylene di(meth)acrylate, divinyl benzene, and the like; and the like.

In certain embodiments, the cross-linking functional group may react with the organic bindable functional group of the organic/inorganic binder and form a chemical bond as aforementioned.

The binder polymer may be prepared in a well-known methods such as emulsion polymerization, solution polymerization, and the like. The polymerization may have no limit regarding temperature, pressure, a method of adding a polymerizable monomer and the like, and the presence or absence of an additive (a polymerization initiator, a molecular weight-adjusting agent, a pH adjusting agent, and the like).

In certain embodiments, the binder polymer may be prepared using a water-soluble initiator such as persulfate and the like, a oil-soluble initiator such as benzoyl peroxide and the like, as a polymerization initiator Examples of the molecular weight-adjusting agent include, but are not limited to, mercaptans such as t-dodecyl mercaptan, n-dodecyl mercaptan, and the like; sulfides such as α-methylstyrene dimer; dimethyl xanthene disulfide, diisopropyl xanthene disulfide, and the like; a nitrile compound such as 2-methyl-3-butenenitrile, 3-pentenenitrile, and the like; which may be used in a single or as a mixture of two or more. Examples of the emulsifier may include an anionic surfactant, a non-ionic surfactant, and the like, which is used in a single or as a mixture of two or more. The emulsifier may be sodium dodecylbenzene sulfonate, etc., and not limited thereto. In addition, a reactive surfactant, a protection colloid, and the like may be used.

In certain embodiments, the binder polymer may have a glass transition temperature of about −50° C. to about 60° C. In certain embodiments, the binder polymer may have a glass transition temperature of about −40° C. to about 20° C.

In certain embodiments, the binder polymer is not limited in shape or form. In certain embodiments, the binder polymer may be an emulsion type, since the emulsion may be used in the composition for the coating layer, thereby forming a uniform coating layer. In certain embodiments, a composition prepared by adding the inorganic compound particles and the organic/inorganic binder to the binder polymer emulsion may be coated on a separator to form a coating layer.

In certain embodiments, the binder polymer emulsion may have a polymer particle diameter ranging from about 0.05 µm to about 0.5 µm. In certain embodiments, the binder polymer emulsion may have a polymer particle diameter ranging from about 0.08 µm to about 0.2 µm. A binder polymer emulsion having a particle size within the range and thus, may provide appropriate viscosity to a composition and resultantly, improve the safety of a rechargeable lithium battery including a separator having a coating layer formed thereof.

In addition, the binder polymer emulsion may have pH ranging from about 7 to about 10.5 to maintain stability. Examples of the pH-adjusting agent may include ammonia, an alkali metal hydroxide (lithium hydroxide, sodium hydroxide, potassium hydroxide), and the like.

In certain embodiments, the binder polymer emulsion may be prepared in a well-known emulsion polymerization method or a phase inversion method. The emulsion polymerization method and phase inversion method have no particular limited conditions.

The composition for a coating layer including a binder polymer, an inorganic compound, and an organic/inorganic binder linker is not particularly limited about a manufacturing method but may be prepared by well-known methods. In certain embodiments, the method may include adding and dispersing an inorganic compound to a binder polymer and dispersing an organic/inorganic binder into the mixture; preparing a binder polymer by adding an organic/inorganic binder along with a binder polymerizable monomer for polymerization thereto, mixing the binder polymer with an inorganic compound, and dispersing the mixture; and the like. The mixing and dispersing method has no particular limit but may include, for example, kneading using a Henschel mixer and the like. In addition, when the binder polymer is an emulsion, an agitation method and like using an agitator may be used.

In certain embodiments, the composition for a coating layer may be an emulsion, which may be easily handled during the preparation of electrode slurry.

In certain embodiments, the coating layer of the separator may be formed on one side or both sides of the porous substrate.

In certain embodiments, the porous substrate may include one or more components selected from the group consisting of a glass fiber, polyester, polyolefin, and polytetrafluoroethylene (PTFE). In certain embodiments, the substrate may include polyolefin such as polyethylene, polypropylene, and the like and may be formed of more than two layers, for example, a multilayer such as a polyethylene/polypropylene separator, a polyethylene/polypropylene/polyethylene separator, a polypropylene/polyethylene/polypropylene separator, and the like. The separator may have excellent heat resistance, even when a single layer rather than a relatively thick multilayered substrate having bad capacity is used.

In certain embodiments, the separator may have a predetermined desirable thickness depending on capacity of a battery. In certain embodiments, the separator may have a thickness ranging from about 10 µm to about 30 µm. In certain embodiments, the separator may have a thickness ranging from about 10 µm to about 15 µm. In certain embodiments, the separator may have a thickness ranging from about 15 µm to about 20 µm. In certain embodiments, the separator may have a thickness ranging from about 20 µm to about 25 µm. In certain embodiments, the separator may have a thickness ranging from about 25 µm to about 30 µm. In certain embodiments, the coating layer may have a thickness ranging from about 0.1 µm to 5 µm with a reference to one side of the separator. In certain embodiments, the coating layer may have a thickness ranging from about 0.1 µm to 1 µm with a reference to one side of the separator. In certain embodiments, the coating layer may have a thickness ranging from about 1 µm to 2 µm with a reference to one side of the separator. In certain embodiments, the coating layer may have a thickness ranging from about 2 µm to 3 µm with a reference to one side of the separator. In certain embodiments, the coating layer may have a thickness ranging from about 3 µm to 4 µm with a reference to one side of the separator. In certain embodiments, the coating layer may have a thickness ranging from about 4 µm to 5 µm with a reference to one side of the separator. When the coating layer has a less thickness than about 0.1 µm, sufficient heat resistance may not be accomplished. In addition, when the coating layer has a larger thickness than about 5 µm, the thickness sum of the coating layer and the separator is increased, deteriorating the capacity of a battery.

Some embodiments provide a rechargeable lithium battery that includes a positive electrode including a positive active material, a negative electrode including a negative active material, a non-aqueous electrolyte, and the separator described above.

In certain embodiments, the rechargeable lithium battery may be classified into lithium ion batteries, lithium ion polymer batteries, and lithium polymer batteries according to the presence of a separator and the kind of electrolyte used in the battery. In certain embodiments, the rechargeable lithium batteries may have a variety of shapes and sizes and thus, include cylindrical, prismatic, or coin-type batteries and also, may be thin film batteries or rather bulky batteries in size. Structures and fabrication methods of lithium ion batteries are well known in the art. Since the separator improves adherence by using the coating layer including the binder polymer, the coating layer more stably bonds the separator with an electrode in a pouch-type battery particularly including a flexible packing material such as a laminate film and the like and thus, prevents a gap generated when the electrode is separated from the separator and fixes the separator into the electrode.

FIG. 1 is an exploded perspective view showing a rechargeable lithium battery according to an aspect of the present embodiments. Referring to FIG. 1, the rechargeable lithium battery 100 is a cylindrical battery that includes a negative electrode 112, a positive electrode 114, a separator 113 disposed between the positive electrode 114 and the negative electrode 112, an electrolyte (not shown) impregnated in the negative electrode 112, the positive electrode 114, and the separator 113, a battery case 120, and a sealing member 140 sealing the battery case 120. In certain embodiments, the rechargeable lithium battery 100 may be fabricated by sequentially stacking a negative electrode 112, a positive electrode 114, and a separator 113, and spiral-winding them and housing the wound product in the battery case 120.

In certain embodiments, the negative electrode includes a current collector and a negative active material layer formed on the current collector, and the negative active material layer includes a negative active material.

In certain embodiments, the negative active material includes a material that reversibly intercalates/deintercalates lithium ions, a lithium metal, a lithium metal alloy, a material being capable of doping lithium, or a transition metal oxide.

In certain embodiments, the material that reversibly intercalates/deintercalates lithium ions includes carbon materials. In certain embodiments, the carbon material may be any generally-used carbon-based negative active material in a lithium ion rechargeable battery. Examples of the carbon material include crystalline carbon, amorphous carbon, and a combination thereof. In certain embodiments, the crystalline carbon may be non-shaped, or sheet, flake, spherical, or fiber shaped natural graphite or artificial graphite. In certain embodiments, the amorphous carbon may be a soft carbon, a hard carbon, mesophase pitch carbonized product, fired coke, and the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

Examples of the material being capable of doping and dedoping lithium include Si, $SiO_x$ (0<x<2), a Si-Q composite, a Si-Q alloy (wherein Q may be an element selected from the group consisting of an alkali metal, an alkaline-earth metal, Group 13 to 16 elements, a transition element, a rare earth element, and a combination thereof, and not Si), Sn, $SnO_2$, a Sn—C composite, a Sn—R alloy (wherein R may be an element selected from the group consisting of an alkali metal, an alkaline-earth metal, Group 13 to 16 elements, a transition element, a rare earth element, and combinations thereof and is not Sn), and the like. The Q and R may be an element of Mg, Ca, Sr, Ba, Ra, Sc, Y, Ti, Zr, Hf, Rf, V, Nb, Ta, Cr, Mo, W, Tc, Re, Fe, Pb, Ru, Os, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

In certain embodiments, the transition metal oxide may include vanadium oxide, lithium vanadium oxide, and the like.

In certain embodiments, the negative active material layer may include an optionally a conductive material.

In certain embodiments, the binder may improve binding properties of the negative active material particles to one another and to a current collector. The binder improves binding properties of negative active material particles with one another and with a current collector. The binder includes a non-water-soluble binder, a water-soluble binder, or a combination thereof. The non-water-soluble binder includes polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof. The water-soluble binder includes a styrene-butadiene rubber, an acrylated styrene-butadiene rubber, polyvinyl alcohol, sodium polyacrylate, a copolymer of propylene and a C2 to C8 olefin, a copolymer of (meth)acrylic acid and (meth)acrylic acid alkyl ester, or a combination thereof. When the water-soluble binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. The cellulose-based compound may be included in an amount of about 0.1 to 3 parts by weight based on 100 parts by weight of the negative active material.

In certain embodiments, the conductive material may improve electrical conductivity of a negative electrode. Any electrically conductive material can be used as a conductive agent, unless it causes a chemical change. Examples of the conductive material include a carbon-based material such as natural graphite, artificial graphite, carbon black, acetylene black, ketjen black, a carbon fiber, and the like; a metal-based material of a metal powder or a metal fiber including copper, nickel, aluminum, silver, and the like; a conductive polymer such as a polyphenylene derivative; or a mixture thereof.

In certain embodiments, the current collector may be a copper foil, a nickel foil, a stainless steel foil, a titanium foil, a nickel foam, a copper foam, a polymer substrate coated with a conductive metal, or combinations thereof.

In certain embodiments, the positive electrode includes a current collector and a positive active material layer disposed on the current collector.

In certain embodiments, the positive active material includes lithiated intercalation compounds that reversibly intercalate and deintercalate lithium ions. In certain embodiments, the positive active material may include a composite oxide including at least one selected from the group consisting of cobalt, manganese, and nickel, as well as lithium. In particular, the following compounds may be used:

$Li_aA_{1-b}R_bL_2$ (0.90≤a≤1.8 and 0≤b≤0.5);
$Li_aE_{1-b}R_bO_{2-c}L_c$ (0.90≤a≤1.8, 0≤b≤0.5 and 0≤c≤0.05);
$LiE_{2-b}R_bO_{4-c}L_c$ (0≤b≤0.5, 0≤c≤0.05);
$Li_aNi_{1-b-c}Co_bR_cL_\alpha$ (0.90≤a≤1.8, 0≤b≤0.5, 0≤c≤0.05 and 0<α≤2);
$Li_aNi_{1-b-c}Co_bR_cO_{2-\alpha}Z_\alpha$ (0.90≤a≤1.8, 0≤b≤0.5, 0≤c≤0.05 and 0<α<2);
$Li_aNi_{1-b-c}Co_bR_cO_{2-\alpha}Z_2$ (0.90≤a≤1.8, 0≤b≤0.5, 0≤c≤0.05 and 0<α<2);
$Li_aNi_{1-b-c}Mn_bR_cI_\alpha$ (0.90≤a≤1.8, 0≤b≤0.5, 0≤c≤0.05 and 0<α≤2);
$Li_aNi_{1-b-c}Mn_bR_cO_{2-\alpha}Z_\alpha$ (0.90≤a≤1.8, 0≤b≤0.5, 0≤c≤0.05 and 0<α<2);
$Li_aNi_{1-b-c}Mn_bR_cO_{2-\alpha}Z_2$ (0.90≤a≤1.8, 0≤b≤0.5, 0≤c≤0.05 and 0<α<2);
$Li_aNi_bE_cG_dO_2$ (0.90≤a≤1.8, 0≤b≤0.9, 0≤c≤0.5 and 0.001<d≤0.1);
$Li_aNi_bCo_cMn_dGeO_2$ (0.90≤a≤1.8, 0≤b≤0.9, 0≤c≤0.5, 0≤d≤0.5 and 0.001≤e≤0.1);
$Li_aNiG_bO_2$ (0.90≤a≤1.8 and 0.001≤b≤0.1);
$Li_aCoG_bO_2$ (0.90≤a≤1.8 and 0.001≤b≤0.1);
$Li_aMnG_bO_2$ (0.90≤a≤1.8 and 0.001≤b≤0.1);
$Li_aMn_2G_bO_4$ (0.90≤a≤1.8 and 0.001≤b≤0.1);
$QO_2$; $QS_2$; $LiQS_2$; $V_2O_5$; $LiV_2O_5$; $LiTO_2$; $LiNiVO_4$; $Li_{(3-f)}J_2(PO_4)_3$ (0≤f≤2);
$Li_{(3-f)}Fe_2(PO_4)_3$ (0≤f≤2); and $LiFePO_4$.

In the above chemical formulae, A is Ni, Co, Mn, or a combination thereof; R is Al, Ni, Co, Mn, Cr, Fe, Mg, Sr, V, a rare earth element, or a combination thereof; L is O (oxygen), F (fluorine), S (sulfur), P (phosphorus), or a combination thereof; E is Co, Mn, or a combination thereof; Z is F (fluorine), S (sulfur), P (phosphorus), or a combination thereof; G is Al, Cr, Mn, Fe, Mg, La, Ce, Sr, V, or a combination thereof; Q is Ti, Mo, Mn, or a combination thereof; T is Cr, V, Fe, Sc, Y, or a combination thereof; and J is V, Cr, Mn, Co, Ni, Cu, or a combination thereof.

In certain embodiments, the compound may have a coating layer on the surface or be mixed with a compound having a coating layer. In certain embodiments, the coating layer may include at least one coating element compound selected from the group consisting of an oxide of a coating element, a hydroxide of a coating element, an oxyhydroxide of a coating element, an oxycarbonate of a coating element, and a hydroxyl carbonate of a coating element. In certain embodiments, the compounds for a coating layer can be amorphous or crystalline. In certain embodiments, the coating element for a coating layer may include Mg, Al, Co, K, Na, Ca, Si, Ti, V, Sn, Ge, Ga, B, As, Zr, or a mixture thereof. In certain embodiments, the coating layer can be formed in a method having no negative influence on properties of a positive active material by including these elements in the compound. For example, the method may include any coating method such as spray coating, dipping, and the like but is not illustrated in more detail, since it is well-known to those who work in the related field.

In certain embodiments, the positive active material layer may include a binder and a conductive material.

In certain embodiments, the binder improves binding properties of the positive active material particles to one another and to a current collector. Examples of the binder may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

In certain embodiments, the conductive material improves electrical conductivity of a negative electrode. Any electrically conductive material may be used as a conductive agent, unless it causes a chemical change. For example, it may include natural graphite, artificial graphite, carbon black, acetylene black, ketjen black, carbon fiber, metal powder, metal fiber or the like such as copper, nickel, aluminum, silver or the like, or one or at least one kind of mixture of conductive material such as polyphenylene derivative or the like.

In certain embodiments, the current collector may be Al but is not limited thereto.

In certain embodiments, the negative and positive electrodes may be fabricated in a method of mixing the active material, a conductive material, and a binder with an active material composition and coating the composition on a current collector, respectively. The electrode-manufacturing method is well known and thus, is not described in detail in the present specification. The solvent may include N-methylpyrrolidone and the like but is not limited thereto. When the water-soluble binder is used in the negative electrode, water may be used as the solvent.

In certain embodiments, the electrolyte includes a non-aqueous organic solvent and a lithium salt.

In certain embodiments, the non-aqueous organic solvent serves as a medium of transmitting ions taking part in the electrochemical reaction of a battery.

In certain embodiments, the organic solvent may include a carbonate-based, ester-based, ether-based, ketone-based, alcohol-based, or aprotic solvent. Examples of the carbonate-based solvent include, but are not limited to, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), or the like, and Examples of the ester-based solvent include, but are not limited to, methyl acetate, ethyl acetate, n-propyl acetate, 1,1-dimethylethyl acetate, methylpropionate, ethylpropionate, γ-butyrolactone, decanolide, valerolactone, mevalonolactone, caprolactone, and the like. Examples of the ether-based solvent include, but are not limited to, dibutyl ether, tetraglyme, diglyme, dimethoxyethane, 2-methyltetrahydrofuran, tetrahydrofuran, and the like, and examples of the ketone-based solvent include, but are not limited to, cyclohexanone, or the like. Examples of the alcohol-based solvent include, but are not limited to, ethyl alcohol, isopropyl alcohol, and the like, and examples of the aprotic solvent include nitriles such as R—CN (wherein R is a C1 to C20 linear, C2 to C20 branched, or C3 to C20 cyclic hydrocarbon group optionally including a double bond, an aromatic ring, or an ether bond), amides such as dimethylformamide, dioxolanes such as 1,3-dioxolane, sulfolanes, or the like.

In certain embodiments, the organic solvent may be used singularly or in a mixture. When the organic solvent is used in a mixture, the mixture ratio may be controlled in accordance with a desirable battery performance as understood by a person skilled in the art.

In certain embodiments, the carbonate-based solvent may be prepared by mixing a cyclic carbonate and a linear carbonate. In certain embodiments, the cyclic carbonate and the linear carbonate are mixed together in the volume ratio of about 1:1 to about 1:9. Within this range, performance of electrolyte may improves lithium ion transport between positive and negative electrodes.

In certain embodiments, the non-aqueous organic electrolyte may be further prepared by mixing a carbonate-based solvent with an aromatic hydrocarbon-based solvent. In certain embodiments, the carbonate-based and the aromatic hydrocarbon-based solvents may be mixed together in a volume ratio ranging from about 1:1 to about 30:1.

In certain embodiments, the aromatic hydrocarbon-based organic solvent may be represented by the following Chemical Formula 1.

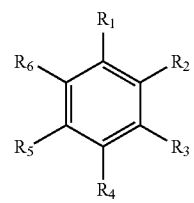

Chemical Formula 1

In Chemical Formula 1, $R_1$ to $R_6$ are each independently hydrogen, halogen, a C1 to C10 alkyl group, a C1 to C10 haloalkyl group, or a combination thereof.

In certain embodiments, the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, or a combination thereof.

In certain embodiments, the non-aqueous electrolyte may further include vinylene carbonate, an ethylene carbonate-based compound represented by the following Chemical Formula 2, or a combination thereof to improve cycle-life.

Chemical Formula 2

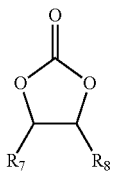

In Chemical Formula 2, $R_7$ and $R_8$ are independently selected from hydrogen, halogen, a cyano group (CN), a nitro group ($NO_2$), and a C1 to C5 fluoroalkyl group, provided that at least one of $R_7$ and $R_8$ is selected from halogen, a cyano group (CN), a nitro group ($NO_2$), and a C1 to C5 fluoroalkyl group.

Examples of the ethylene carbonate-based compound include difluoro ethylenecarbonate, chloroethylene carbonate, dichloroethylene carbonate, bromoethylene carbonate, dibromoethylene carbonate, nitroethylene carbonate, cyanoethylene carbonate, fluoroethylene carbonate, and the like. In certain embodiments, the amount of vinylene carbonate or the ethylene carbonate-based compound may be controlled to improve cycle life and may be adjusted within an appropriate range.

The lithium salt is dissolved in an organic solvent, supplies a battery with lithium ions, operates a basic operation of the rechargeable lithium battery, and improves lithium ion transportation between positive and negative electrodes therein. Examples of the lithium salt include $LiPF_6$, $LiBF_4$, $LiSbF_6$, $LiAsF_6$, $LiC_4F_9SO_3$, $LiClO_4$, $LiAlO_2$, $LiAlCl_4$, $LiN(SO_2C_xF_{2x+1})(SO_2C_yF_{2y+1})$ (where x and y are natural numbers of 1 to 20, respectively), LiCl, LiI, $LiB(C_2O_4)_2$ (lithium bis(oxalato)borate), or a combination thereof, as a supporting electrolytic salt. In certain embodiments, the lithium salt may be used in a concentration ranging from about 0.1 M to about 2.0 M. When the lithium salt is included within the above concentration range, an electrolyte may have excellent performance and lithium ion mobility due to optimal electrolyte conductivity and viscosity.

In certain embodiments, the separator 113 separates a negative electrode 112 from a positive electrode 114 and provides a transporting passage for lithium ions, which is the same as described above.

Exemplary embodiments are described in more detail according to Examples and Comparative Examples below. The following examples are for illustrative purposes only and are not intended to limit the scope of the one or more embodiments. In the following Examples, the part by weight is based on 100 parts by weight of the monomer.

EXAMPLES

Preparation Example 1

Synthesis of Binder Polymer

A flask having a condenser, a thermometer, an introducing pipe for a monomer emulsion, an introducing pipe for nitrogen gas, and an agitator, and 60 parts by weight of distilled water and 1.5 parts by weight of sodium dodecylbenzene sulfonate was placed under nitrogen. Then, the flask was heated up to 80° C. Subsequently, styrene (2 parts by weight) was added to the flask. The resulting mixture was agitated for 5 minutes, and then 10 parts by weight of a 5% ammonium persulfate aqueous solution was added thereto for initiation of the reaction.

One hour later, an emulsion solution including 30 parts by weight of 2-ethylhexylacrylate, 68 parts by weight of styrene, 2 parts by weight of acrylic acid, 0.5 parts by weight of sodium dodecylbenzenesulfonate, and 40 parts by weight of distilled water was added to the reactor over 3 hours in a dropwise fashion. Simultaneously, 6 parts by weight of a 5% ammonium persulfate aqueous solution was added to the reactor over 3 hours in a dropwise fashion.

When the monomer emulsion was completely added thereto, the mixture was additionally reacted for 2 hours and then cooled down to 20° C. Remaining monomer was removed under a reduced pressure, affording a polymer emulsion. Polymer particles with a diameter ranging from 100 nm to 200 nm were dispersed in the emulsion.

Preparation Example 2

A 10 L autoclave reactor containing 60 parts by weight of distilled water and 1.5 parts by weight of sodium dodecylbenzenesulfonate was placed under nitrogen. Subsequently, the mixture was heated to 70° C. Next, 2 parts by weight of styrene was added to the reactor, the resulting mixture was agitated for 5 minutes, and 10 parts by weight of a 2% potassium persulfate aqueous solution was added to the reactor, initiating a reaction.

One hour later, an emulsion including 40 parts by weight of butadiene, 46 parts by weight of styrene, 10 parts by weight of methylmethacrylate, 3 parts by weight of itaconic acid, 1 parts by weight of hydroxyethylacrylate, 0.5 parts by weight of sodium dodecylbenzene sulfonate, and 40 parts by weight of distilled water was added to the reactor over 4 hours in a dropwise fashion. Simultaneously, 10 parts by weight of a 2% potassium persulfate aqueous solution was added to the reactor in a dropwise fashion over 3 hours.

When the monomer emulsion was completely added thereto, the mixture was additionally reacted for 3 hours and cooled down to 20° C., and monomer remaining in the reactor was removed under a reduced pressure, affording a polymer emulsion.

Example 1

Separator

The pH of a colloidal silica (with hydroxyl group on the surface thereof, Snowtex 0: Nissan Chemical Industries Ltd., Tokyo, Japan, a solid content: 20 wt %, an average particle diameter: 600 nm) was adjusted to pH 8 using lithium hydroxide. The resulting colloidal silica (5 parts by weight) as an inorganic compound was added to 100 parts by weight of the polymer emulsion (a) according to Preparation Example 1 as a binder polymer. The mixture was agitated for 10 minutes, and 0.2 parts by weight of an organic/inorganic binder (γ-glycidoxy propyltrimethoxysilane) was added thereto. The resulting mixture was agitated for 20 minutes, obtaining a composition for a coating layer.

The composition for a coating layer was gravure-printed to be 16 μm thick on both sides of a polyethylene film to prepare a separator. The thickness of the coating layer on one side was 3 μm.

Example 2

A separator was fabricated according to the same method as Example 1 except for using the binder polymer according to Preparation Example 2.

Comparative Example 1

The binder polymer according to Preparation Example 1 was coated on a separator.

Comparative Example 2

A separator was fabricated according to the same method as Example 1 except omitting the organic/inorganic binder used in Example 1.

Comparative Example 3

The polyethylene film was used as a separator.

Positive Electrode

Positive slurry was prepared by mixing $LiCoO_2$ as a positive active material, polyvinylidene fluoride (PVDF) as a binder, and carbon as a conductive agent in a weight ratio of 92:4:4 in N-methyl-2-pyrrolidone. This slurry was coated on a 20 μm-thick aluminum foil, dried, and compressed, fabricating a positive electrode.

Negative Electrode

Negative active material slurry was prepared by mixing artificial graphite as a negative active material, a styrene-butadiene rubber as a binder, and carboxylmethyl cellulose as a thickener in a weight ratio of 96:2:2 in water. This slurry was coated on a 15 μm-thick copper foil, dried, and compressed, fabricating a negative electrode.

Fabrication of Electrode

The positive and negative electrodes and a separator were used to fabricate a pouch-type cell. Then, an electrolyte solution used a mixed solution of EC (ethyl carbonate)/EMC (ethylmethyl carbonate)/DEC (diethyl carbonate) (3/5/2 of a volume ratio) including a 1.3M concentration $LiPF_6$.

Evaluation Example 1

Thermal Shrinkage Ratio Test

The separators according to Examples 1 and 2 and Comparative Examples 1 to 3 were heat-treated in a 130° C. convention oven for 10 minutes and cooled down to a room temperature and then, measured regarding shrinkage rate.

As shown in Table 1, the separators according to Examples 1 and 2 had remarkably improved shrinkage rate compared with the separators according to Comparative Examples 1 to 3.

Evaluation Example 2

Charge and Discharge Characteristic

The fabricated pouch-type cells using separators according to Examples 1 and 2 and Comparative Examples 1 to 3 were constant-current charged at 0.2 C under a temperature of 25° C. up to a voltage of 4.2V and constant-voltage charged up to a current of 0.01 C while maintaining 4.2V. Then, the pouch cells were constant-current discharged at 0.2 C up to a voltage of 3.05V (formation process).

The cells through the formation process were constant-current charged at 0.5 C under a temperature of 25° C. up to a voltage of 4.2V and constant-voltage charged up to 0.01 C while maintaining 4.2V. Then, the cells were constant-current discharged at 0.5 C up to a voltage of 3.0V. This cycle was repeated 30 times.

The charge and discharge experiment results of Examples 1 and 2 and Comparative Examples 1 to 3 are provided in the following Table 1.

TABLE 1

|  | Example 1 | Example 2 | Comparative Example 1 | Comparative Example 2 | Comparative Example 3 |
|---|---|---|---|---|---|
| Thermal shrinkage ratio | ◎ | ◎ | X | Δ | X |
| Charge and discharge efficiency | ◎ | ○ | ○ | ○ | ○ |
| Capacity retention | ◎ | ◎ | ○ | ○ | Δ |

(Note: ◎: very good, ○: good, Δ: average, X: bad)

As shown in Table 1, the lithium cells according to Examples 1 and 2 had equivalent or improved charge and discharge efficiency and cycle-life characteristic compared with the ones according to Comparative Examples 1 to 3. In addition, the lithium cells according to Examples 1 and 2 had remarkably improved thermal shrinkage ratio and thus, improved thermal safety.

While this disclosure has been described in connection with what is presently considered to be practical exemplary embodiments, it is to be understood that the invention is not limited to the disclosed embodiments and is intended to cover various modifications and equivalent arrangements included within the spirit and scope of the appended claims. Therefore, the aforementioned embodiments should be understood to be exemplary but not limiting this disclosure in any way.

What is claimed is:

1. A separator comprising
a porous substrate; and
a coating layer including an (inorganic compound)-(organic/inorganic binder)-(binder polymer), where the (inorganic compound)-(organic/inorganic binder)-(binder polymer) is formed by reacting an inorganic compound, an organic/inorganic binder, and a binder polymer, wherein the inorganic compound is hydrophilic particles having a hydroxyl group on the surface, wherein the binder polymer is a particle having a particle diameter of about 0.01 μm to about 0.5 μm.

2. The separator of claim 1, wherein the porous substrate comprises at least one component selected from the group consisting of a glass fiber, polyester, polyolefin, polytetrafluoroethylene (PTFE), and polyacrylonitrile.

3. The separator of claim 1, wherein the inorganic compound-organic/inorganic binder has an average particle diameter of about 1 nm to about 1000 nm.

4. The separator of claim 3, wherein the particle of the inorganic compound-organic/inorganic binder is coated continuously or discontinuously on the surface of the binder polymer.

5. The separator of claim 1, wherein the inorganic compound comprises at least one selected component selected from the group consisting of metal oxide, semi-metal oxide, and metal fluoride.

6. The separator of claim 1, wherein the organic/inorganic binder comprises epoxyalkylalkoxysilane.

7. The separator of claim 1, wherein the binder polymer comprises a cross-linking functional group.

8. The separator of claim 7, wherein the cross-linking functional group comprises one selected from a hydroxyl group, a glycidyl group, an amino group, an N-methylol group, a vinyl group, and a combination thereof.

9. The separator of claim 1, wherein the binder polymer comprises one selected from the group consisting of a styrene-butadiene rubber, an acrylated styrene-butadiene rubber, an acrylonitrile-butadiene rubber, an acrylonitrile-butadiene-styrene rubber, an acrylic rubber, a butyl rubber, a fluorine rubber, polytetrafluoroethylene, polyethylene, polypropylene, an ethylene propylene copolymer, polyethylene oxide, polyvinylpyrrolidone, polyepichlorohydrine, polyphosphazene, polyacrylate, polyacrylonitrile, polystyrene, ethylenepropylenedienecopolymer, polyvinylpyridine, chlorosulfonated polyethylene, latex, a polyester resin, an acrylic resin, a phenolic resin, an epoxy resin, polyvinyl alcohol, carboxylmethyl cellulose, hydroxypropylmethyl cellulose, hydroxypropyl cellulose, and diacetyl cellulose.

10. The separator of claim 1, wherein the binder polymer is a particle having a particle diameter of about 0.01 μm to about 0.5 μm.

11. The separator of claim 1, wherein the coating layer is formed by mixing the particle of the inorganic compound and the organic/inorganic binder with an emulsion solution of the binder polymer to prepare a composition and coating the composition.

12. The separator of claim 1, wherein the porous substrate comprises at least one component selected from the group consisting of a glass fiber, polyester, polyolefin, polytetrafluoroethylene (PTFE), and polyacrylonitrile.

13. A rechargeable lithium battery comprising:
a positive electrode including a positive active material;
a negative electrode including a negative active material;
a non-aqueous electrolyte; and
a separator according to claim 1.

* * * * *

UNITED STATES PATENT AND TRADEMARK OFFICE
CERTIFICATE OF CORRECTION

PATENT NO.         : 9,083,035 B2
APPLICATION NO.    : 13/601846
DATED              : July 14, 2015
INVENTOR(S)        : Jung-Ock Yeou Page 1 of 1

It is certified that error appears in the above-identified patent and that said Letters Patent is hereby corrected as shown below:

Title Page

In column 2 (page 2, item 56) at line 4, Under Other Publications, change "10-2012-0229427" to --10-2012-0029427--.

In the Specification

In column 4 at line 67, Change "group" to --group.--.

In column 6 at line 50, Change "initiator" to --initiator.--.

In column 9 at line 19, Change "Si-Q" to --Si-C--.

In column 9 at line 61, Change "to" to --to about--.

In column 13 at line 32, Change "$(SO_2C_yF_{2y+i})$" to --$(SO_2C_yF_{2y+1})$--.

Signed and Sealed this
Eighth Day of March, 2016

Michelle K. Lee
*Director of the United States Patent and Trademark Office*